(12) United States Patent
Atwater et al.

(10) Patent No.: US 8,597,377 B1
(45) Date of Patent: Dec. 3, 2013

(54) CHLORINE MODIFIED HIGH VOLTAGE LIMN2O4 CATHODE MATERIAL FOR RECHARGEABLE LITHIUM/LITHIUM-ION ELECTROCHEMICAL SYSTEMS

(75) Inventors: Terrill Bradford Atwater, North Plainfield, NJ (US); Paula Cristina Tavares, Tinton Falls, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 260 days.

(21) Appl. No.: 13/081,774

(22) Filed: Apr. 7, 2011

(51) Int. Cl.
*H01M 4/04* (2006.01)
*H01M 4/50* (2010.01)

(52) U.S. Cl.
USPC .......................... 29/623.1; 429/221; 429/224

(58) Field of Classification Search
USPC ........ 429/221, 224, 231.1; 29/623.1; 423/266
See application file for complete search history.

(56) References Cited

U.S. PATENT DOCUMENTS

| | | | |
|---|---|---|---|
| 5,135,732 A | 8/1992 | Barboux et al. | |
| 5,753,202 A | 5/1998 | Wang et al. | |
| 6,093,503 A * | 7/2000 | Isoyama et al. | 429/61 |
| 6,699,297 B1 * | 3/2004 | Yamawaki et al. | 29/623.1 |
| 6,706,443 B1 * | 3/2004 | Krampitz et al. | 429/224 |
| 2007/0134558 A1 * | 6/2007 | Fukunaga et al. | 429/329 |

* cited by examiner

*Primary Examiner* — Patrick Ryan
*Assistant Examiner* — Ladan Mohaddes
(74) *Attorney, Agent, or Firm* — Azza Jayaprakash

(57) ABSTRACT

A chlorine-modified lithium manganese-based $AB_2O_4$ spinel cathode material is provided. Furthermore, a lithium or lithium ion rechargeable electrochemical cell is provided incorporating chlorine-modified lithium manganese-based $AB_2O_4$ spinel cathode material in a positive electrode. In addition, a process for preparing a stable chlorine-modified lithium manganese-based $AB_2O_4$ spinel cathode material is provided.

7 Claims, 13 Drawing Sheets

CHLORINE MODIFIED HIGH VOLTAGE LIMN2O4 CATHODE MATERIAL FOR RECHARGEABLE LITHIUM/LITHIUM-ION ELECTROCHEMICAL SYSTEMS

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of electrochemical power sources, and, more particularly, to rechargeable lithium and lithium-ion batteries using manganese-based materials as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_y$-$Co_zO_2$.

Today, rechargeable lithium batteries are used in portable electronic devices including cellular phones and laptop computers. Future uses of rechargeable lithium battery systems are targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 and 4.75 volts. Lithium electrochemical systems can operate between 3.0 and 4.35 volts or between 2.0 and 3.5 volts. Additionally, lithium electrochemical systems have excellent charge retention due to a low self-discharge rate.

Manganese dioxide ($MnO_2$) based materials are attractive for use as cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures denoted by $\alpha$, $\beta$, $\gamma$, and $\lambda$. In lithium electrochemical cells, the active material is bound to an aluminum current collector with either Teflon or pVdF mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additional external forces including elevated temperatures also promote cathode fracture; and structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which result in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can create problems. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and are referred to by the following prefixes: $\alpha$, $\beta$, $\gamma$, and $\lambda$. $\alpha$-$MnO_2$ is the most stable $MnO_2$ structure. $\alpha$-$MnO_2$ is one-dimensional and the lattice contains both one by one and two by two channels for lithium insertion/extraction. $\beta$-$MnO_2$ is a tetragonal structure with the lattice containing one by one channels for lithium insertion/extraction. $\gamma$-$MnO_2$ is also one-dimensional, existing in both hexagonal or orthorhombic crystal structures with a lattice that contains one by two channels for lithium insertion/extraction. Because of their stability $\alpha$-$MnO_2$, $\beta$-$MnO_2$, and $\gamma$-$MnO_2$ are not considered rechargeable. However, cycling of lithium into the $\alpha$-$MnO_2$, $\beta$-$MnO_2$, and $\gamma$-$MnO_2$ lattice can be achieved with rigid stoichiometric control.

Conventionally, $\lambda$-$MnO_2$ is considered the preferred $MnO_2$ based cathode material for rechargeable lithium electrochemical systems. $\lambda$-$MnO_2$ is created through the delithiation of $Li_xMn_2O_4AB_2O_4$ spinel. The $\lambda$-$MnO_2$ crystal structure is maintained through both the charge and discharge of the $LiMn_2O_4$ spinel. The maintenance of the $\lambda$-$MnO_2$ structure during insertion and extraction of lithium in the $Li_xMn_2O_4$ spinel makes it an attractive couple with lithium for rechargeable electrochemical systems. The $\lambda$-$MnO_2$ crystal structure is a three dimensional cubic array. This crystal structure promotes mechanical stability and adequate pathways for lithium insertion/extraction. Degradation of the $\lambda$-$MnO_2$ crystal structure forming $\alpha$, $\beta$ or $\gamma$-$MnO_2$ crystals and other $MnO_xO_y$ phases, reduces the capacity of the cathode material.

As lithium intercalates, the size and orientation of the crystal structures change. In $Li_xMn_2O_4$ spinel materials, when $0.05<x<1$, the crystal structure is cubic ($\lambda$-$MnO_2$). When $1<x<1.8$, the structure of $Li_xMn_2O_4$ (no longer a $AB_2O_4$ spinel) is tetragonal. Additionally, when $x<0.05$, phase transition to the more stable $\alpha$, $\beta$ and $\gamma$ $MnO_2$ can occur. Continued charge and discharge promotes the transformation of the cubic crystal structure to other cubic, tetragonal, and monoclinic phases. Tetragonal and monoclinic crystal structures may become inactive leading to the loss of active cathode material. Voltage control, maintaining $0.05<x<1$, allows for the mitigation of the formation of unwanted crystal structures.

When the potential of the lithium/$Li_xMn_2O_4$ electrochemical system is maintained between 3.0 and 4.25 volts, the cubic phase is maintained. When the potential of the system drops below 3.0 volts, the $Li_xMn_2O_4$ cathode material undergoes a phase change from cubic to tetragonal. When the potential of the system increases above 4.25 volts, the $Li_xMn_2O_4$ cathode material becomes stripped of the lithium component and undergoes a phase change from cubic ($\lambda$-$MnO_2$) to the more stable $\alpha$, $\beta$ and/or $\gamma$ $MnO_2$.

Other phase transitions that lead to capacity fading include the formation of $Mn_2O_3$ and $Mn_3O_4$. The $Mn_2O_3$ and $Mn_3O_4$ formations result from the liberation of oxygen in the $MnO_2$ and $Mn_2O_4$ structures. The valence state of manganese in these structures is 3+ or less. This lower valence state creates a stable crystal structure that is not conducive to lithium intercalation and, therefore, not rechargeable. As more $Mn_2O_3$ and $Mn_3O_4$ are formed, less $MnO_2$ and $Mn_2O_4$ remain and the usefulness of the cathode decreases.

Thus, conventional lithium/$Li_xMn_2O_4$ electrochemical systems remain reversible against lithium, when x is maintained between 0.10 and 0.85 for $Li_xMn_2O_4$, between 0.1 and 0.5 for $Li_xMnO_2$, and between 0.4 and 0.95 for $Li_xCoO_2$, $Li_xNiO_2$ and $Li_xNi_yCo_zO_2$. However, if the stoichiometry exceeds the aforementioned limitations, the lithium manganese-based $AB_2O_4$ cathode material undergoes a phase change and is no longer reversible. Consequently, the cell will no longer accept a charge rendering the cell inoperable. In order to maintain the stoichiometry of conventional lithium/$Li_xMn_2O_4$ electrochemical systems within the aforementioned limitations, rigid electronic control is employed. Accordingly, there has been a long-felt need for a lithium manganese-based $AB_2O_4$ cathode material that resolves problems associated with loss of reversibility in lithium batteries without the need for rigid stoichiometry electronic control. This problem presents a major obstacle for rechargeable lithium battery technology.

Other disadvantages of conventional lithium manganese-based $AB_2O_4$ spinel materials include the limited cycle life for lithium electrochemical systems. An additional limiting factor for lithium manganese-based $AB_2O_4$ spinel materials is the time required to process the raw materials and synthesize the desired product. Conventional methods require multiple mixing, grinding and calcining steps, which take a time period of days to complete.

SUMMARY OF THE INVENTION

The present disclosure resolves the aforementioned problems associated with conventional lithium manganese-based $AB_2O_4$ spinel cathode materials in lithium electrochemical systems and rechargeable lithium electrochemical systems. The present disclosure provides a chlorine-modified lithium manganese-based $AB_2O_4$ spinel cathode material with improved performance over conventional $LiMn_2O_4$ lithium battery cathode material. The present chlorine-modified lithium manganese-based $AB_2O_4$ spinel cathode material exhibits overvoltage and under-voltage tolerance and avoids problems associated with loss of reversibility in lithium batteries without suffering from the disadvantages, limitations and shortcomings associated with rigid stoichiometry electronic control. More specifically, the present $Li/Li_xMn_2O_{4-y}Cl_z$ electrochemical cells exhibit increased discharge potential and enhanced over-charge potential behavior that allows the cathode to be fully reversible at elevated charge potentials and decreased discharge potentials. The present electrochemical cell system maintains its recyclability after charge potentials greater than 5.0 volts and discharge potentials less than 2.0 volts. Thus, the present $Li/Li_xMn_2O_{4-y}Cl_z$ electrochemical cells produce the required reversibility and meet other significant lithium battery operational objectives (e.g., low impedance and thermal stability). In addition, the cycle life of the lithium cells fabricated using the present spinel material is significantly longer than cells fabricated using conventional lithium manganese-based $AB_2O_4$ spinel materials.

Furthermore, the present disclosure provides a method of preparing the aforementioned chlorine-modified lithium manganese-based $AB_2O_4$ spinel cathode material via a solid state reaction between a manganese compound, a lithium compound, and chlorinated lithium compound yielding the present $Li_xMn_2O_{4-y}Cl_z$ compound. By introducing chlorine into the starting material mixture, the synthesis process time of lithium manganese-based $AB_2O_4$ spinel materials is dramatically reduced. In contrast to conventional preparation methods, the addition of chlorine in the formulation and fabrication process reduces the processing time by at least an order of magnitude. While conventional preparation methods take 48 to 72 hours, the preparation method according to the present disclosure may take less than 4 hours. In addition, the preparation method according to the present disclosure is performed at relatively low temperatures, affording better process control.

According to an exemplary embodiment of the present disclosure, a stable chlorine-modified lithium manganese-based $AB_2O_4$ spinel cathode material is provided having the general formula $Li_xMn_2O_{4-y}Cl_z$, where $x\approx1$, $y\approx z$, and $0.005<z<0.25$. More specifically, x ranges from 0.75 to 1.25, from 0.85 to 1.15, or from 0.9 to 1.1; and y and z range from 0.005 to 0.25, from 0.0125 to 0.075, or from 0.015 to 0.035. The reversible region for x ranges from 0.05 to 1.9 in the lithium electrochemical cell. The initial specific capacity for chlorine-modified lithium manganese-based $AB_2O_4$ spinel cathode material was 205 mAh/g when coupled with lithium and cycled between 4.25 and 2.0 volts. The coulombic efficiency of the system was found to be at least 97 percent with a specific capacity of 130 mAh/g when cycled between 4.25 volts and 3.0 volts. The discharge capacity of the system was maintained at greater than 80 percent the initial discharge for over 25 cycles. Additionally, the system proved to maintain its recyclability after charge potentials greater than 5.0 volts and discharge potentials less than 2.0 volts.

In one embodiment, a method of preparing a chlorine-modified lithium manganese-based $AB_2O_4$ spinel cathode material includes mixing a chlorinated lithium compound, a manganese compound, and a lithium compound to produce a homogenous mixture; and calcining the homogenous mixture for a time period no greater than 4 hours at a temperature of at least 300° C.

Another embodiment of the present disclosure is a chlorine-modified lithium manganese-based $AB_2O_4$ spinel cathode material prepared using the aforementioned process. In yet another embodiment of the present disclosure, a lithium electrochemical cell includes an anode and a cathode containing the present chlorine-modified lithium manganese-based $AB_2O_4$ spinel material.

BRIEF DESCRIPTION OF THE DRAWINGS

The accompanying drawings, which are included to provide further understanding of the present disclosure, and are incorporated in and constitute a part of the specification, illustrate preferred embodiments of the present disclosure, and together with the description serve to explain the principles of the present disclosure. The present disclosure will now be described further with reference to the accompanying drawings as follows.

DETAILED DESCRIPTION

Figure 1:
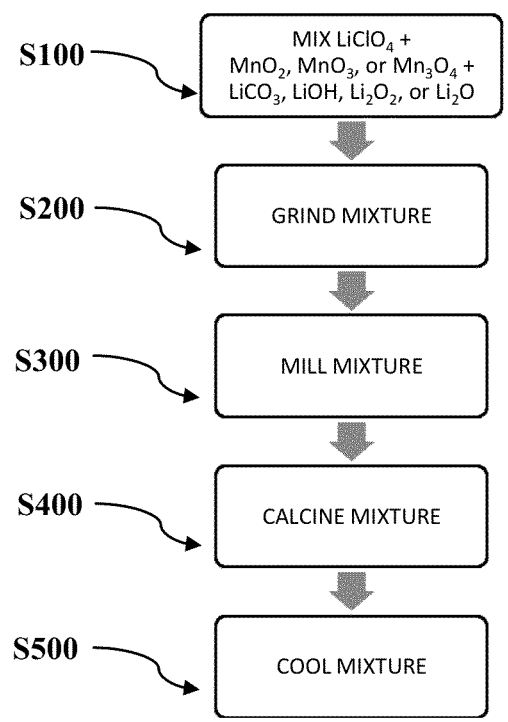
FIG. 1 is a flowchart illustrating exemplary steps for fabricating a $Li_xMn_2O_{4-y}Cl_z$ material according to the present disclosure.

FIG. 1 is a flowchart illustrating process steps in an exemplary embodiment of the present disclosure. More specifically, FIG. 1 shows exemplary steps according to the present disclosure for the preparation of $Li_xMn_2O_{4-y}Cl_z$ material via a solid state reaction. In step S100, a chlorine-containing lithium compound is added to a manganese compound and a lithium compound. The stoichiometric ratio of lithium to manganese to chlorine (Li:Mn:Cl) in the mixture of starting materials may be (0.9-1.1):2.0:(0.005-0.25); (0.9-1.1):2.0:(0.0125-0.075); or 1.0:2.0:(0.015-0.035).

Suitable chlorine-containing lithium compounds include, but are not limited to, $LiClO_4$ and $LiCl$. Suitable manganese compounds include, but are not limited to, $MnO_2$, $Mn_2O_3$ or $Mn_3O_4$. Additionally, manganese nitrate, manganese hydroxide and manganese acetate are also suitable manganese compounds. Suitable lithium compounds include, but are not limited to, lithium carbonate ($Li_2CO_3$), LiOH, $Li_2O$, and $Li_2O_2$.

In Step S200, the mixture is ground and mixed using a mortar and pestle, alternative grinding and mixing methods include ball milling and high amplitude vibration milling. In Step S300, the mixture is then mixed in a random orbit mixer mill to ensure a homogeneous mixture of the raw materials. Alternatively, other suitable milling systems include stirred media mill and low amplitude vibration mill. Alternatively, step S300 can be removed from the process if the raw materials are homogenously mixed during step S200. For example, the materials can be homogenously mixed in a ball mill during step S200.

In Step S400, the mixture is calcined in a furnace at 600° C. for 2 hours. Alternatively, suitable calcination temperatures and calcinations times range from 300° C. to 800° C. (for from 1 to 4 hours), from 400° C. to 600° C. (for from 1.5 to 3 hours), or from 450° C. to 600° C. (for from 2 to 2.5 hours). In Step S500, the mixture is cooled at a temperature ranging from 20° C. to 300° C. (for from 1 to 24 hours), from 20° C. to 150° C. (for from 1 to 4 hours), or from 20° C. to 50° C. (for from 1 to 2.5 hours).

The exemplary process described above results in the formulation of a family of chlorine-modified $Li_xMn_2O_4$ $AB_2O_4$ spinel materials, based on characterization with X-ray diffraction. The general formula for the chlorine-modified $Li_xMn_2O_4$ $AB_2O_4$ spinel materials prepared according to the present invention is $Li_xMn_2O_{4-y}Cl_z$, where $x \approx 1$ and $y \approx z$. More specifically, x ranges from 0.75 to 1.25, from 0.85 to 1.15, or from 0.9 to 1.1; and y and z range from 0.005 to 0.25, from 0.0125 to 0.075, or from 0.015 to 0.035. An exemplary electrochemical cell composed of a lithium anode and $Li_xMn_2O_{4-y}Cl_z$ cathode proves to be reversible between 5.2 and 2.0 volts. In an exemplary lithium electrochemical cell including a $Li_xMn_2O_{4-y}Cl_z$ cathode according to the present disclosure, the reversible region for x ranges from 0.05 to 1.9 (in the lithium electrochemical cell).

In order to evaluate the electrochemical properties of the present $Li_xMn_2O_{4-y}Cl_z$ $AB_2O_4$ spinel electrochemical system, laboratory coin cells were fabricated using methods described in detail below. Experimental cells may also be fabricated using other methods known in the art, incorporating the present $Li_xMn_2O_{4-y}Cl_z$ $AB_2O_4$ spinel material described in the present disclosure. The experimental cells were composed of a lithium anode separated from a Teflon bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_xMn_2O_{4-y}Cl_z$, conductive carbon, and a binder in a 83.3:8.3:8.3 weight percent basis, respectively. Suitable conductive carbon materials include, but are not limited to, conductive carbon black (commercially available from various sources, including Cabot Corporation, under the tradename VULCAN XC72 or VULCAN XC72R), graphite, carbon nanofibers, and carbon nanoparticles (commercially available under the tradename PURE BLACK, manufactured by Superior Graphite Co.). Suitable binders include polytetrafluoroethylene (commercial available under the trade name TEFLON, manufactured by DuPont), polyvinylidene fluoride (PVDF) and latex. The cathode may contain by weight 40%-95% of $Li_xMn_2O_{4-y}Cl_z$, 1%-40% of conductive carbon, and 1%-20% binder.

The cathode mix was rolled to 0.06 cm and dried in a vacuum oven. The cathode mass was approximately 0.15 g. The cathode and 0.075 cm thick lithium foil was cut using a 1.58 cm diameter (1.96 $cm^2$) hole punch. A 0.01 cm nonwoven glass separator was used for the separator and as a wick. The electrolyte used was 1 M $LiPF_6$ in proportional mixtures of dimethyl carbonate and ethylene carbonate. Other suitable electrolytes include, but are not limited to, lithium hexafluoroarsenate monohydrate ($LiAsF_6$), lithium perchlorate ($LiClO_4$), lithium tetrafluoroborate ($LiBF_4$), and lithium triflate ($LiCF_3SO_3$).

The cells were cycled with an ARBIN Model BT-2043 Battery Test System. A two step charge profile was used. The charge profile consisted of a constant current charged at 1.0, 2.0 and 4.0 mA to 4.2, 5.0 and 5.25 volts followed by an applied constant voltage of 4.2, 5.0, and 5.25 volts. The constant voltage was maintained for 5 to 10 hours or until the charge current dropped to 0.1 mA. The cells were discharged at 1.0, 2.0 and 4 mA to 3.0 and 2.0 volts. A rest period of 15 minutes between charge and discharge cycles allowed for the cells to equilibrate. Prior to cycling cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

Figure 2:
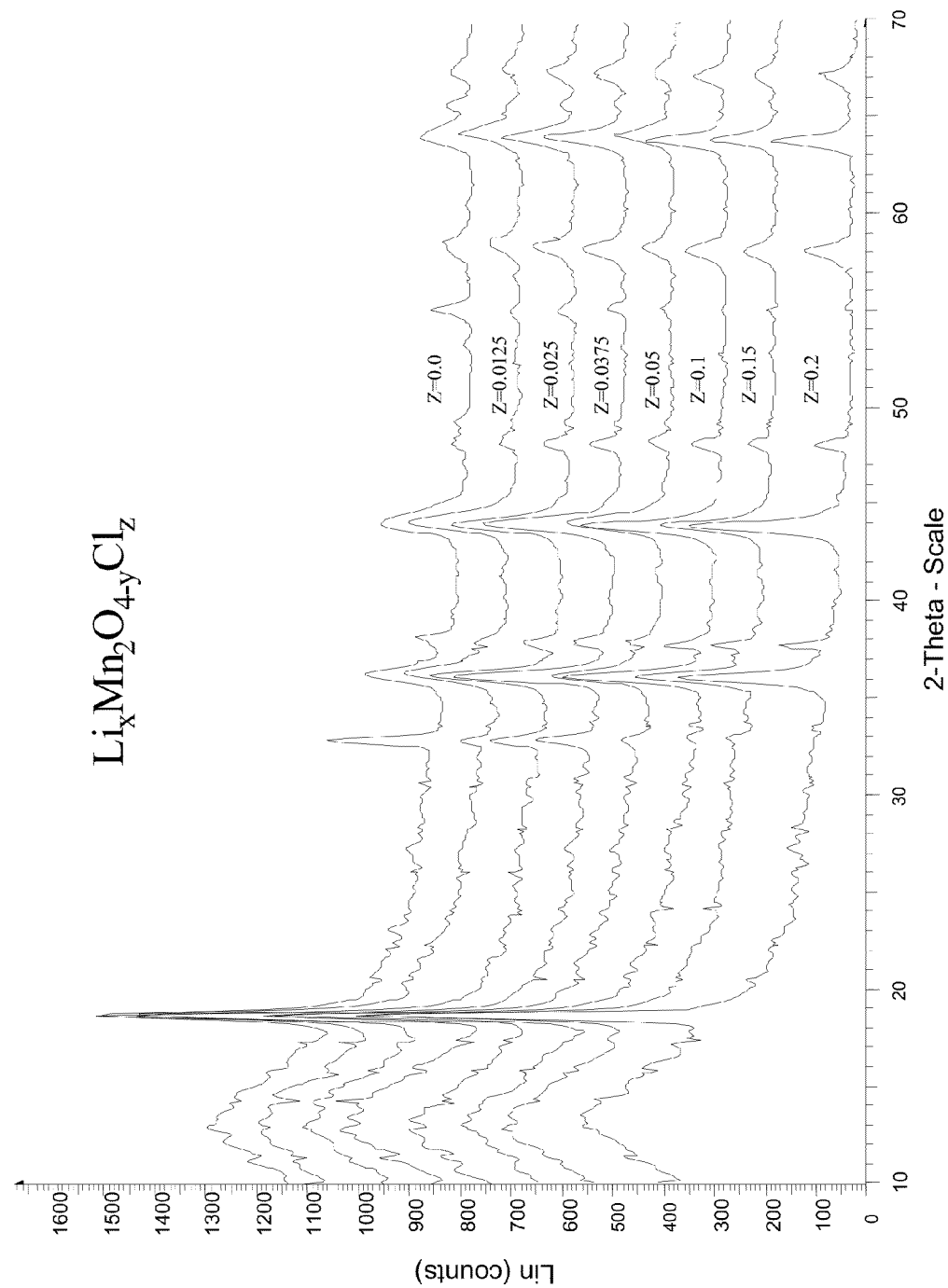
FIG. 2 is a graph showing X-ray diffraction spectra for $Li_xMn_2O_{4-y}Cl_z$ materials according to exemplary embodiments of the present disclosure.
Figure 3:
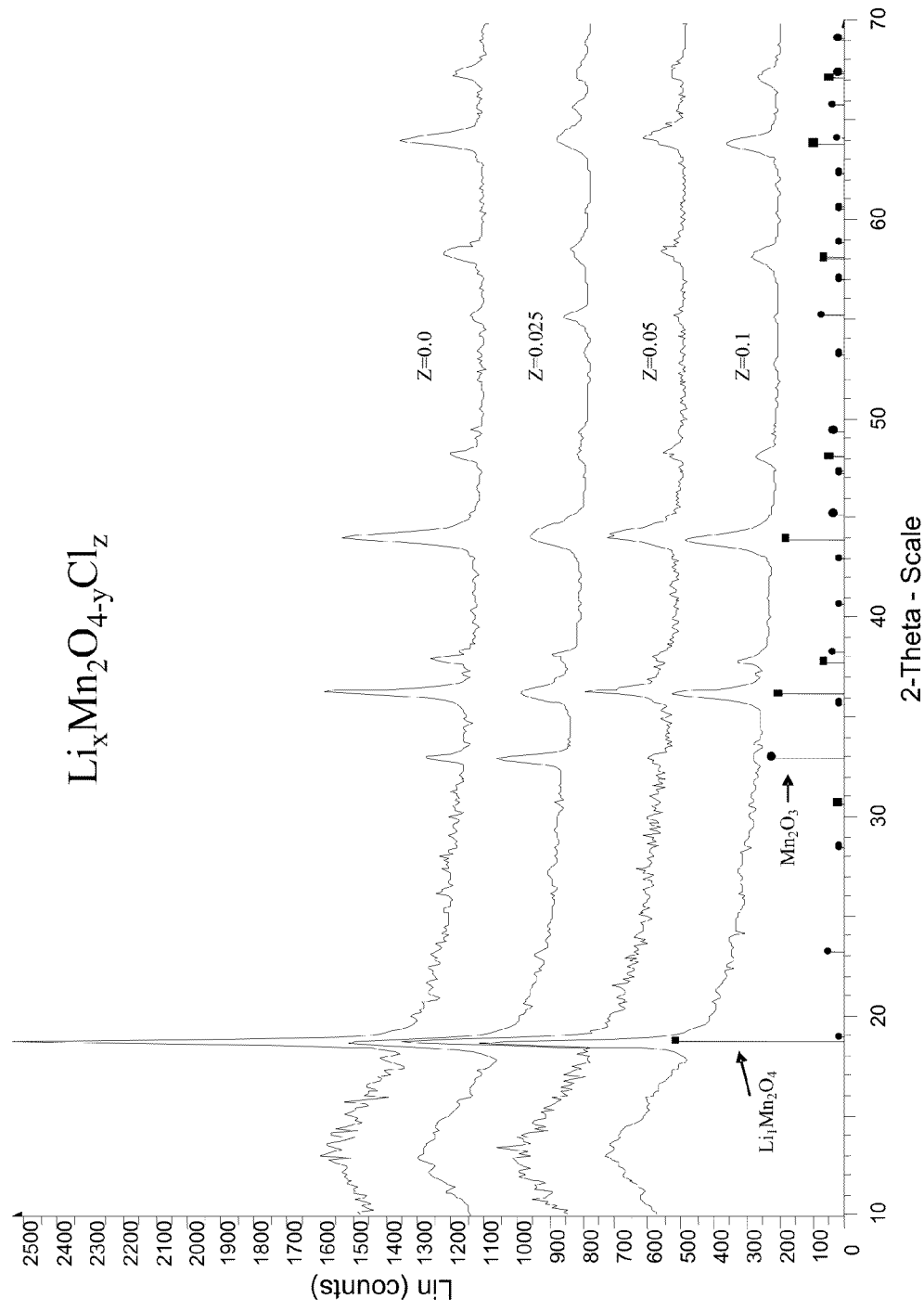
FIG. 3 is a graph showing X-ray diffraction spectra for $Li_xMn_2O_{4-y}Cl_z$ materials according to exemplary embodiments of the present disclosure.
Figure 4:
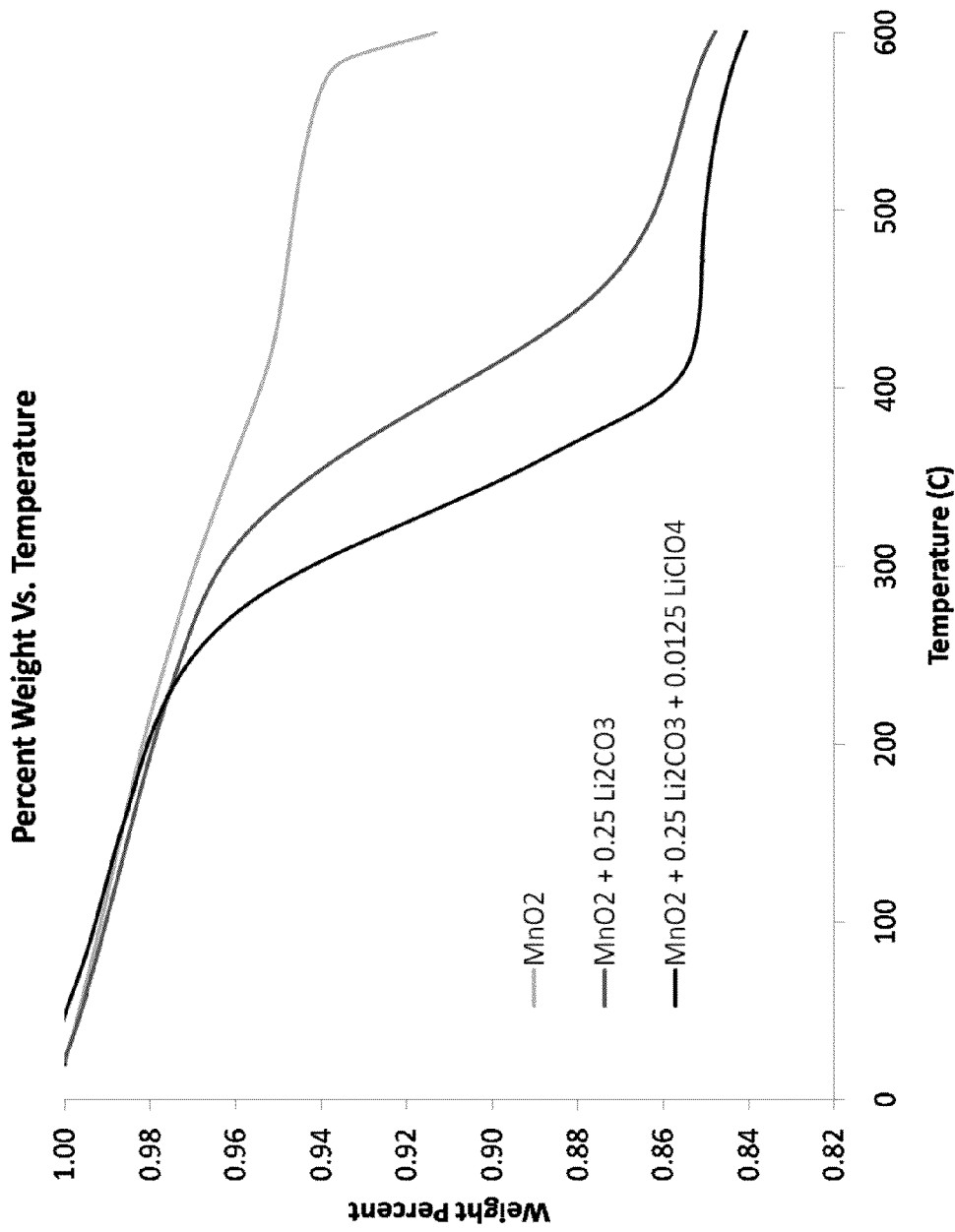
FIG. 4 is a graph showing thermal gravimetric data for $Li_xMn_2O_{4-y}Cl_z$ starting materials and an exemplary formulation mixture according to exemplary embodiments of the present disclosure.
Figure 5:
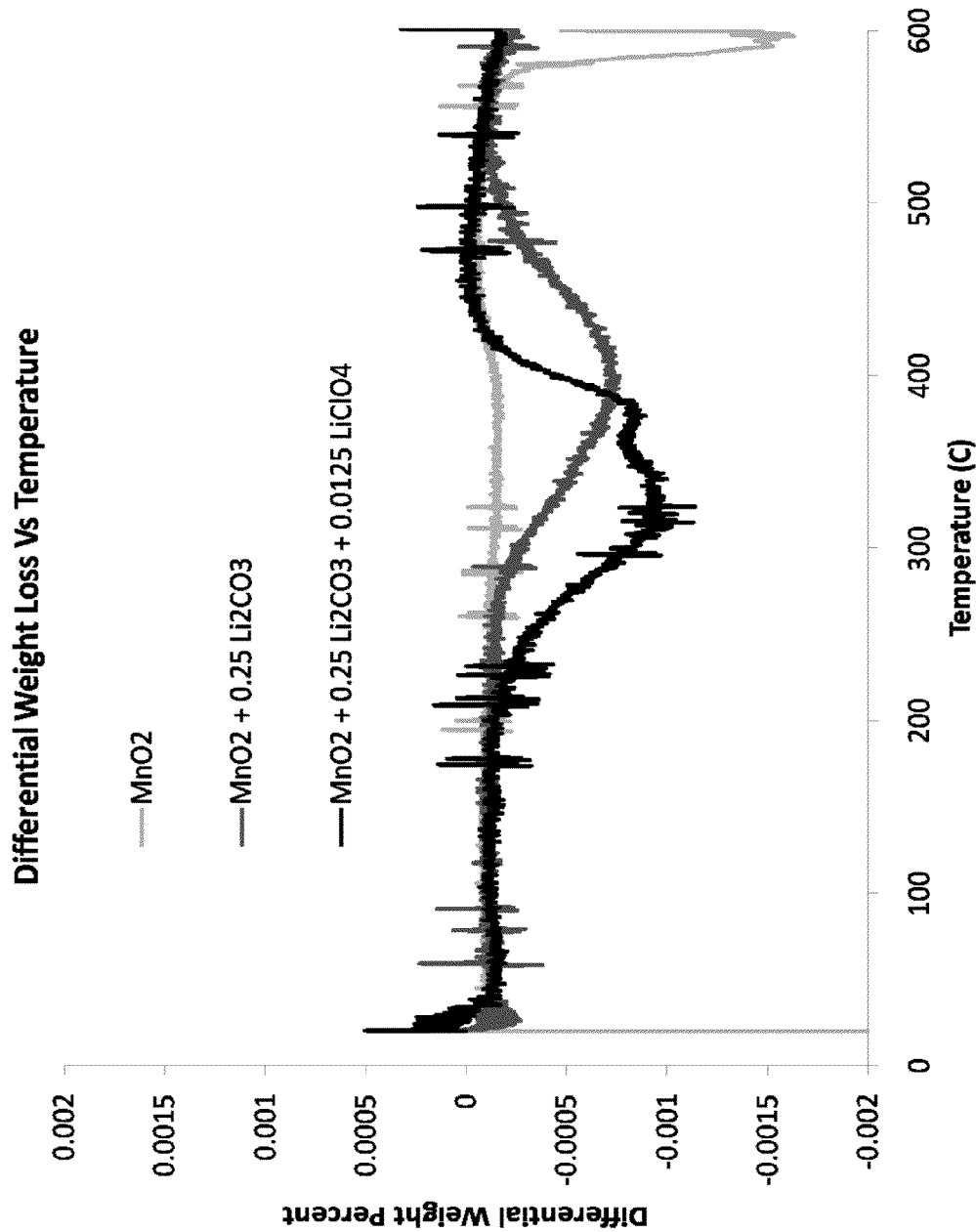
FIG. 5 is a graph showing thermal gravimetric data for $Li_xMn_2O_{4-y}Cl_z$ starting materials and an exemplary formulation mixture according to exemplary embodiments of the present disclosure.

FIGS. 2 and 3 show the X-ray diffraction spectra for a $Li_xMn_2O_{4-y}Cl_z$ spinel material according to the present disclosure. In particular, the spectra in FIGS. 2 and 3 represent the formulated and fabricated $Li_xMn_2O_{4-y}Cl_z$ material, where $x \approx 1$, $y \approx z$, and z ranges from 0.0 to 0.2. FIGS. 4 and 5 show the thermal gravimetric data for the starting material mixture for the $Li_xMn_2O_{4-y}Cl_z$ spinel material according to the present disclosure. In particular, the thermal gravimetric data in FIGS. 4 and 5 represents the formulated mixture where the lithium to manganese to chorine ratio is 1.025 to 2 to 0.0125. The data displays the reaction thermodynamics for the conventional art and the present disclosure.

Figure 6:
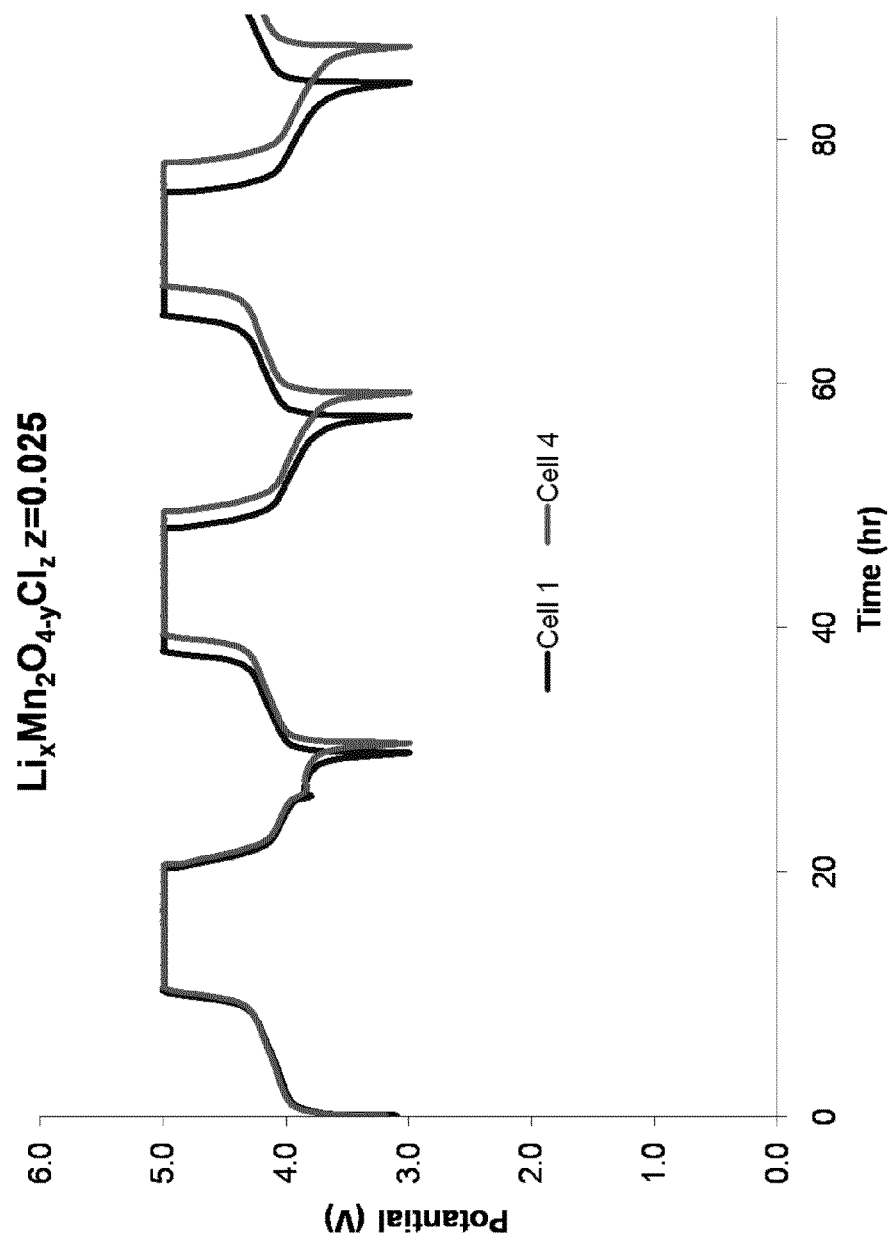
FIG. 6 is a graph comparing the forming cycle and the next two charge/discharge curves for a $Li/Li_xMn_2O_{4-y}Cl_{0.025}$ cell according to an exemplary embodiment of the present disclosure versus the forming cycle and the next two charge/discharge curves for a conventional coin cell cycled between 3.0 and 5.0 volts at 2.0 mA.
Figure 7:
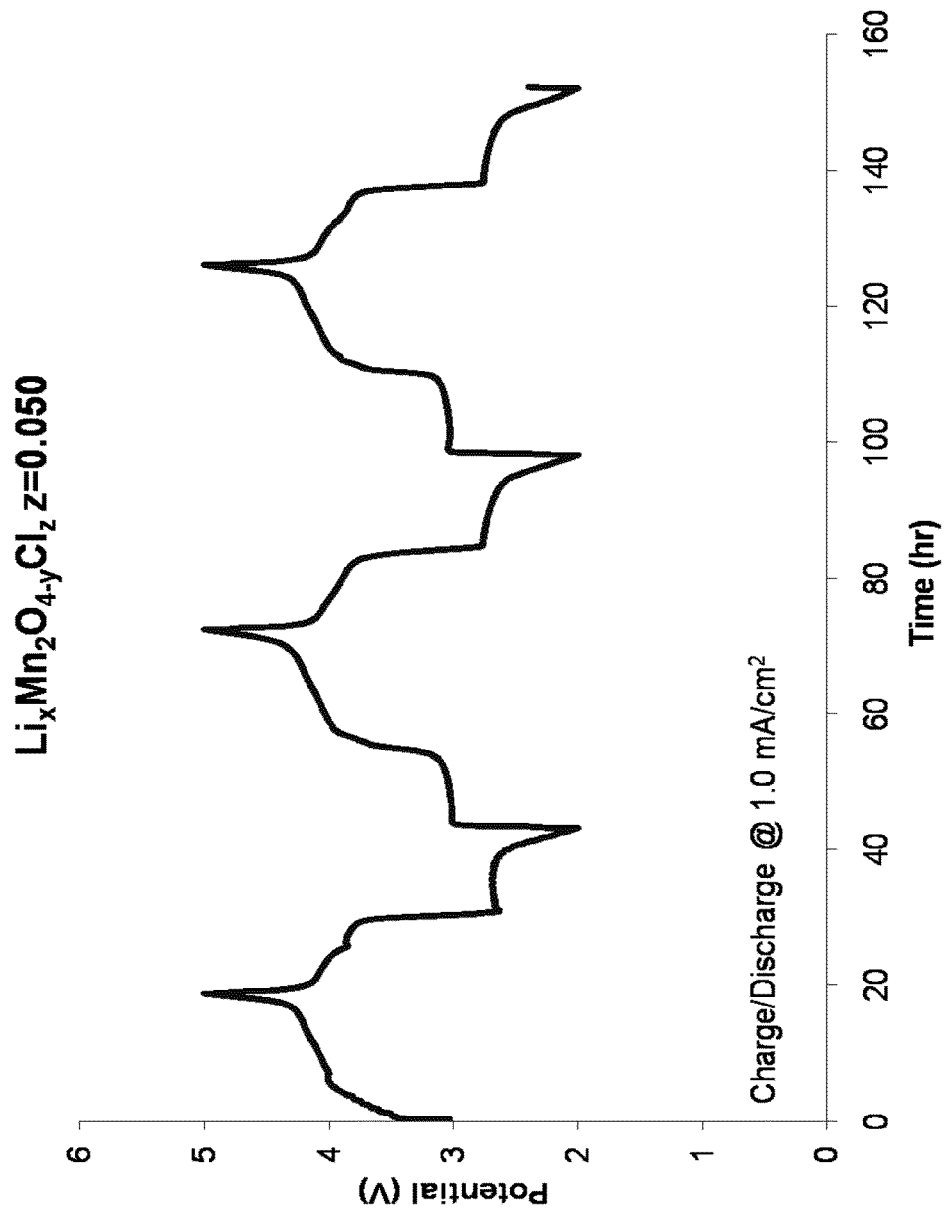
FIG. 7 is a graph illustrating cycling (charge/discharge) curves for an exemplary $Li/Li_xMn_2O_{4-y}Cl_{0.05}$ cell according to the present disclosure cycled between 2.0 and 5.0 volts at 2.0 mA.
Figure 8:
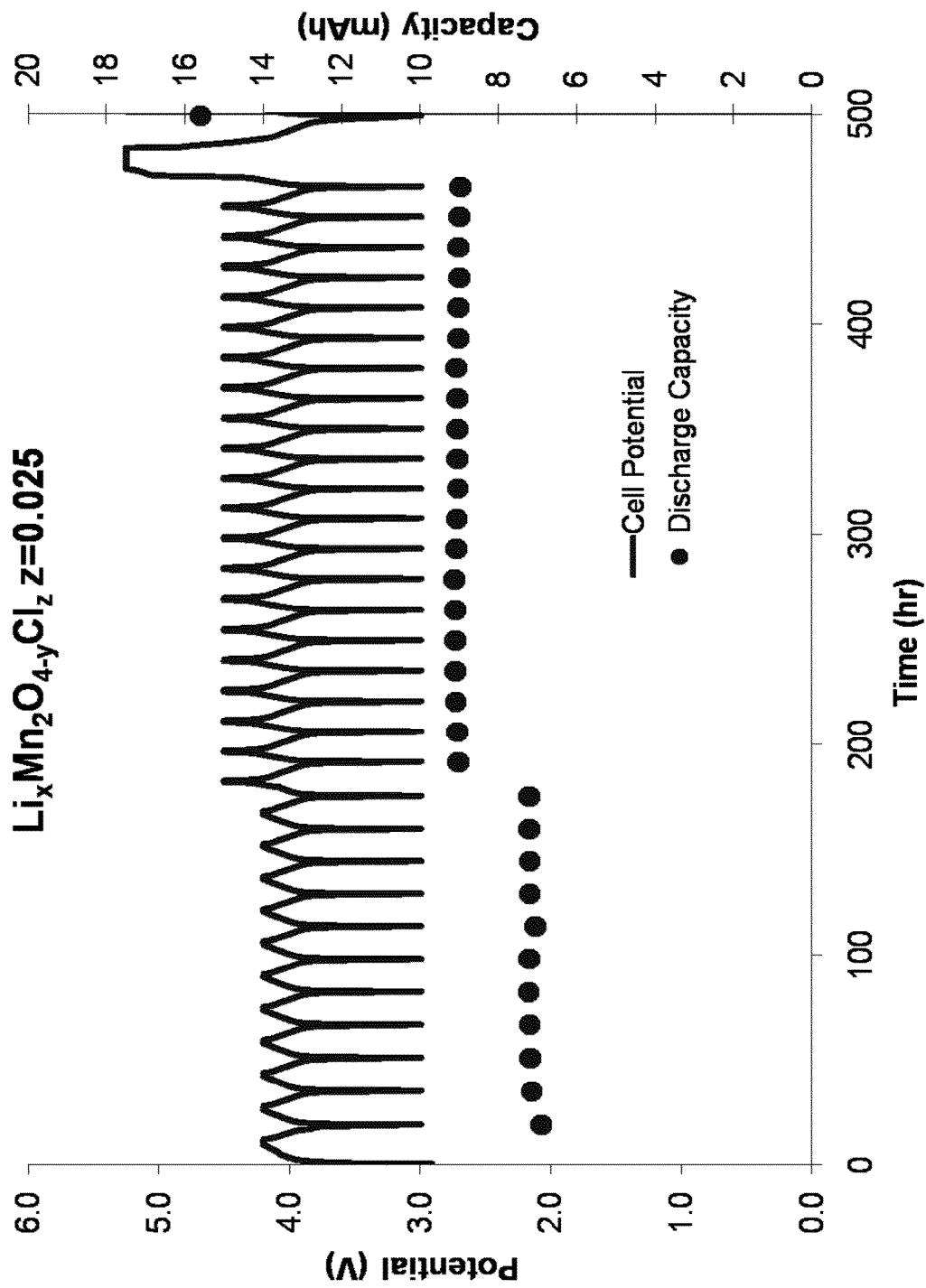
FIG. 8 is a graph illustrating the tenth through forty-first cycling (charge/discharge) curves for an exemplary $Li/Li_xMn_2O_{4-y}Cl_{0.025}$ cell according to the present disclosure cycled at 1.0 mA.

FIGS. 6 through 13 illustrate cycling (charge/discharge) curves for exemplary electrochemical cells according to the present disclosure. Specifically, FIG. 4 shows comparative charge/discharge curves for an exemplary $Li/Li_xMn_2O_{4-y}Cl_{0.025}$ cell according to the present disclosure. The graph in FIG. 6 represents the forming cycle and the next two cycles cycled between 3.0 and 5.0 volts at 2.0 mA. FIG. 7 displays an exemplary $Li/Li_xMn_2O_{4-y}Cl_{0.05}$ cell according to the present disclosure, cycled between 2.0 and 5.0 volts. FIG. 8 shows the $10^{st}$ through $41^{st}$ charge and discharge cycles for an exemplary $Li/Li_xMn_2O_{4-y}Cl_{0.025}$ cell according to the present disclosure, cycled at 1 mA.

Figure 9:
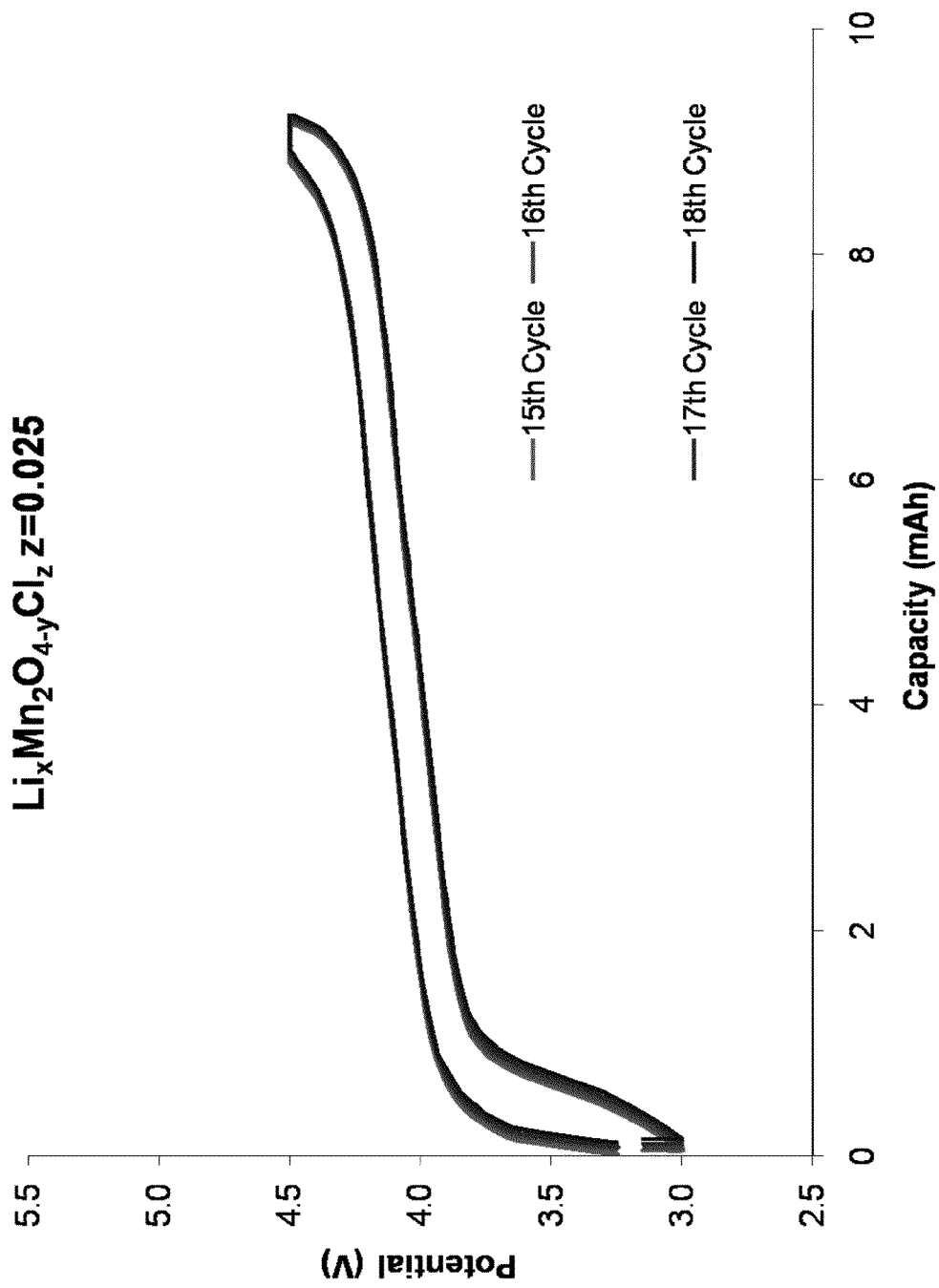
FIG. 9 is a graph illustrating the fifteenth through eighteenth cycling (charge/discharge) hysteresis curves for an exemplary $Li/Li_xMn_2O_{4-y}Cl_{0.025}$ cell according to the present disclosure cycled between 3.0 and 4.5 volts at 1.0 mA.
Figure 10:
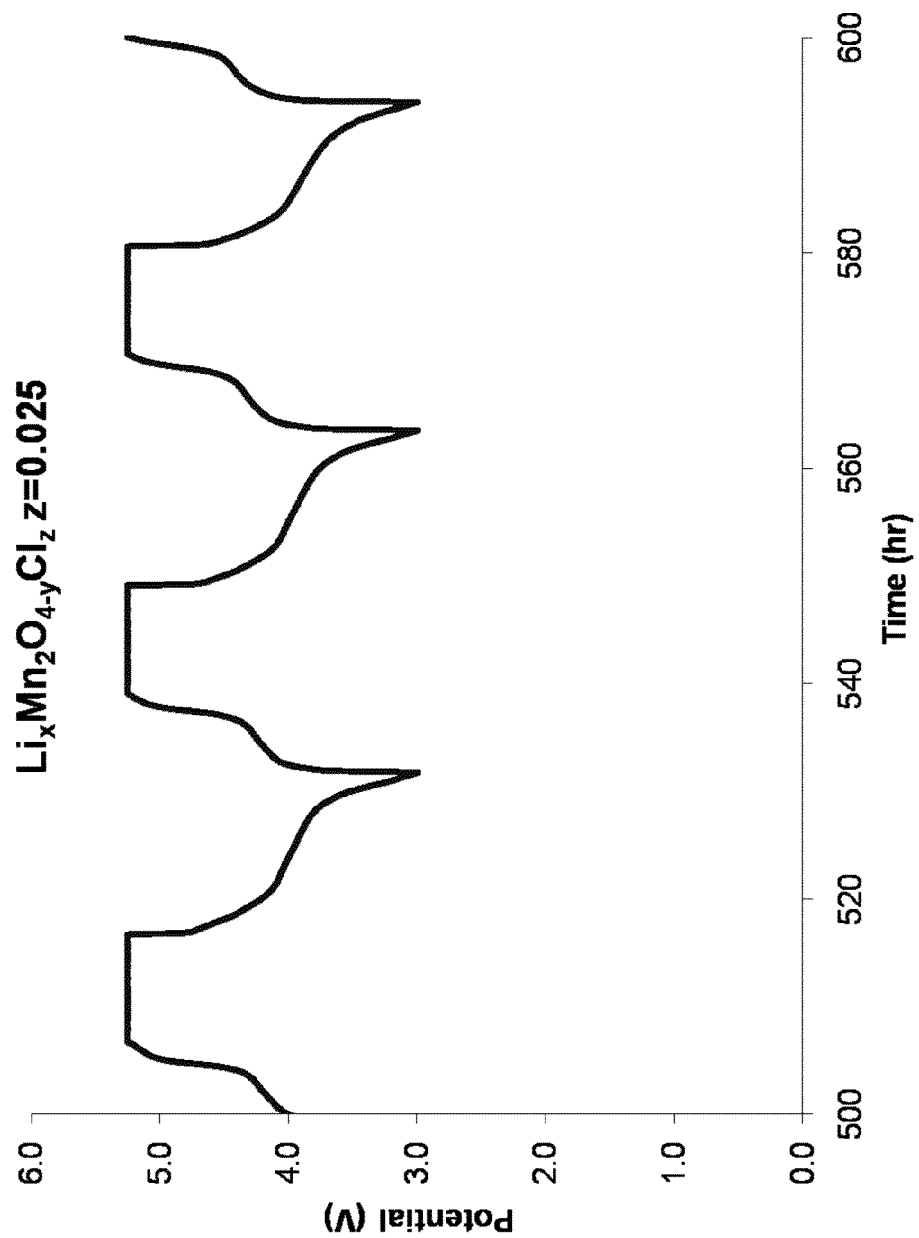
FIG. 10 is a graph illustrating representative cycling (charge/discharge) curves for an exemplary $Li/Li_xMn_2O_{4-y}Cl_{0.025}$ cell according to the present disclosure (cycled between 3.0 and 5.2 volts at 1.0 mA).
Figure 11:
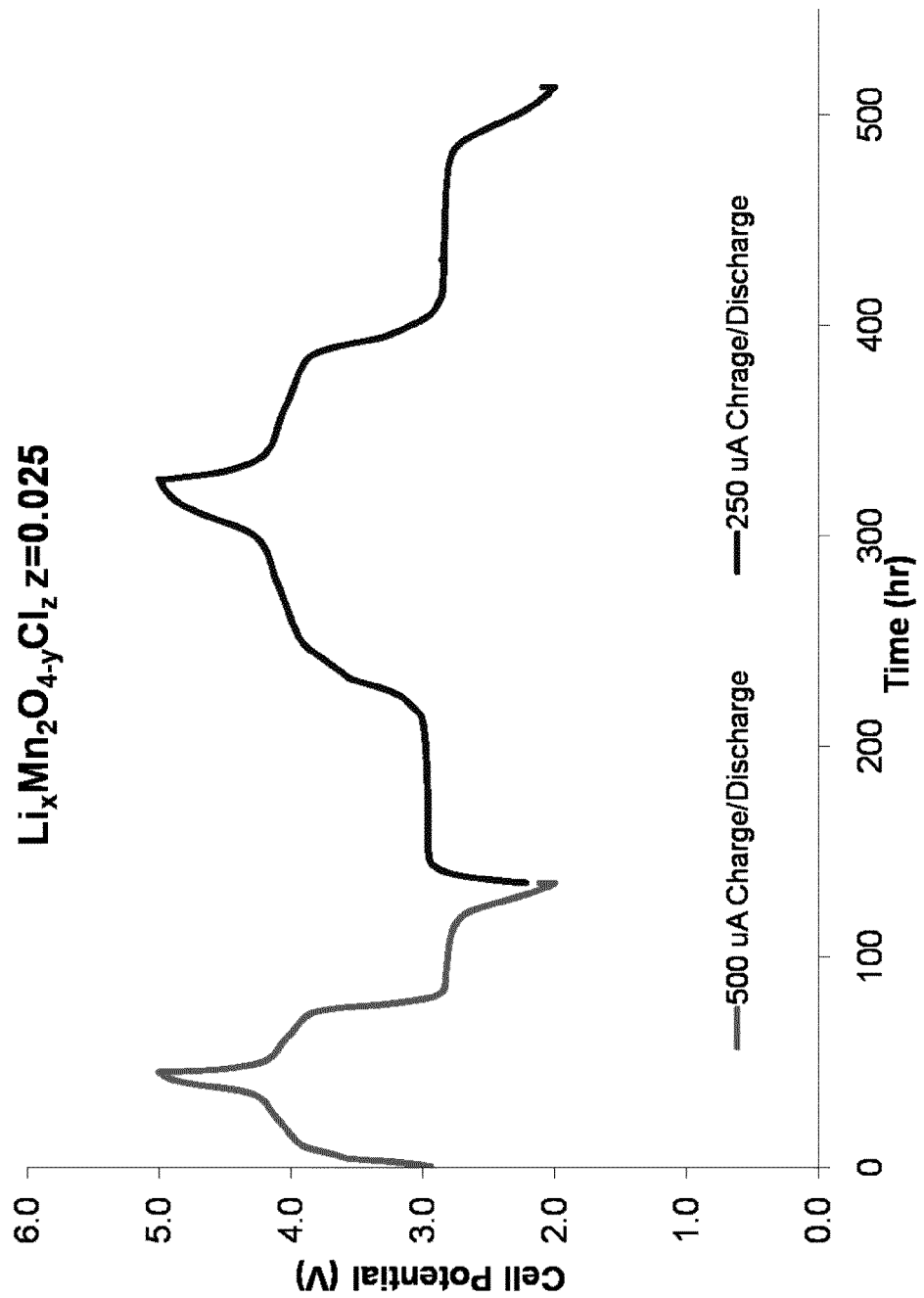
FIG. 11 is a graph illustrating representative cycling (charge/discharge) curves for an exemplary $Li/Li_xMn_2O_{4-y}Cl_{0.0125}$ cell and the cell potential curve (cycled between 2.0 and 5.0 volts at 0.25 mA and 0.5 mA).
Figure 12:
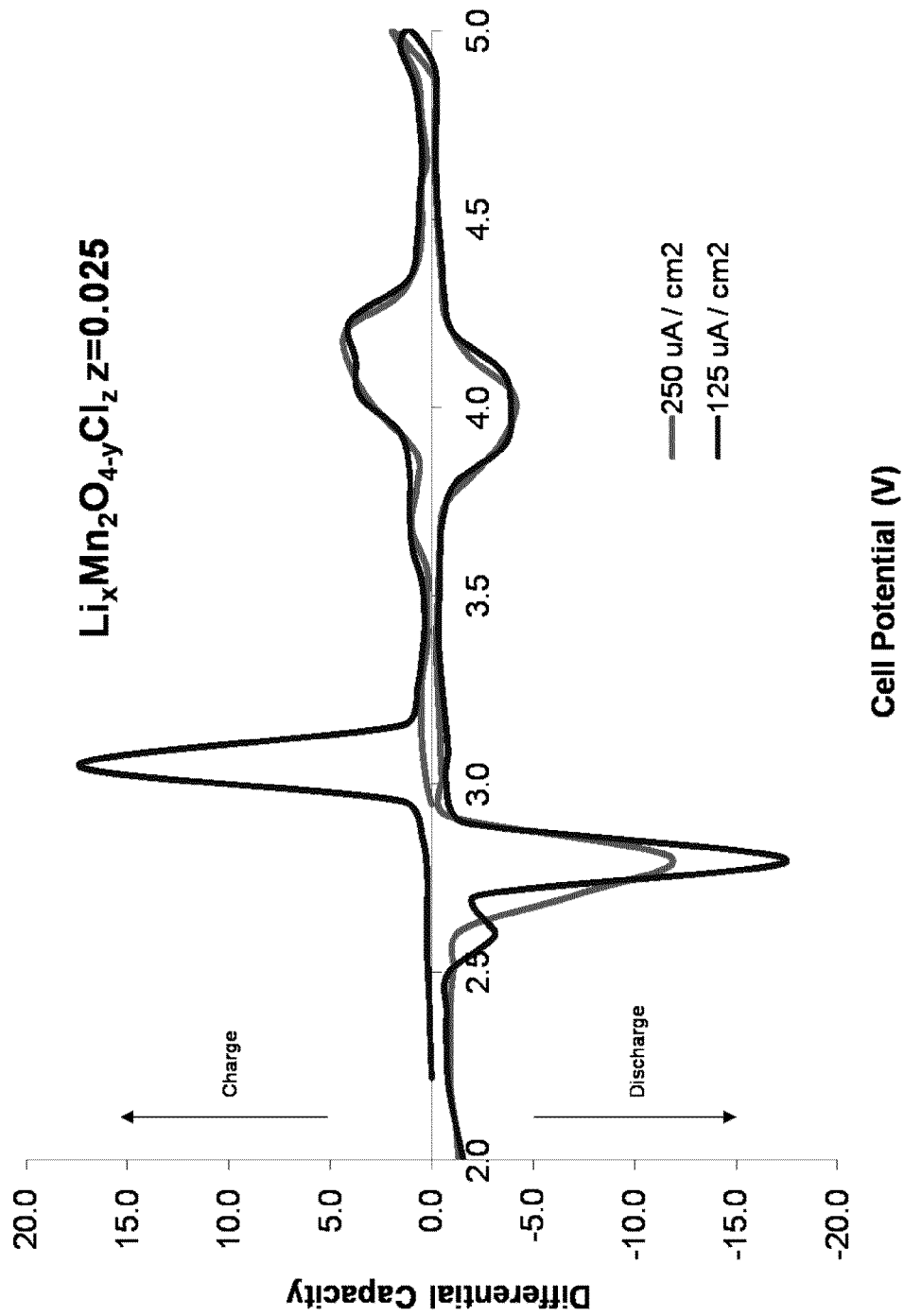
FIG. 12 is a graph illustrating representative cycling (charge/discharge) curves displayed as differential capacity for an exemplary $Li/Li_xMn_2O_{4-y}Cl_{0.0125}$ cell (cycled between 2.0 and 5.0 volts at 0.25 mA and 0.5 mA).
Figure 13:
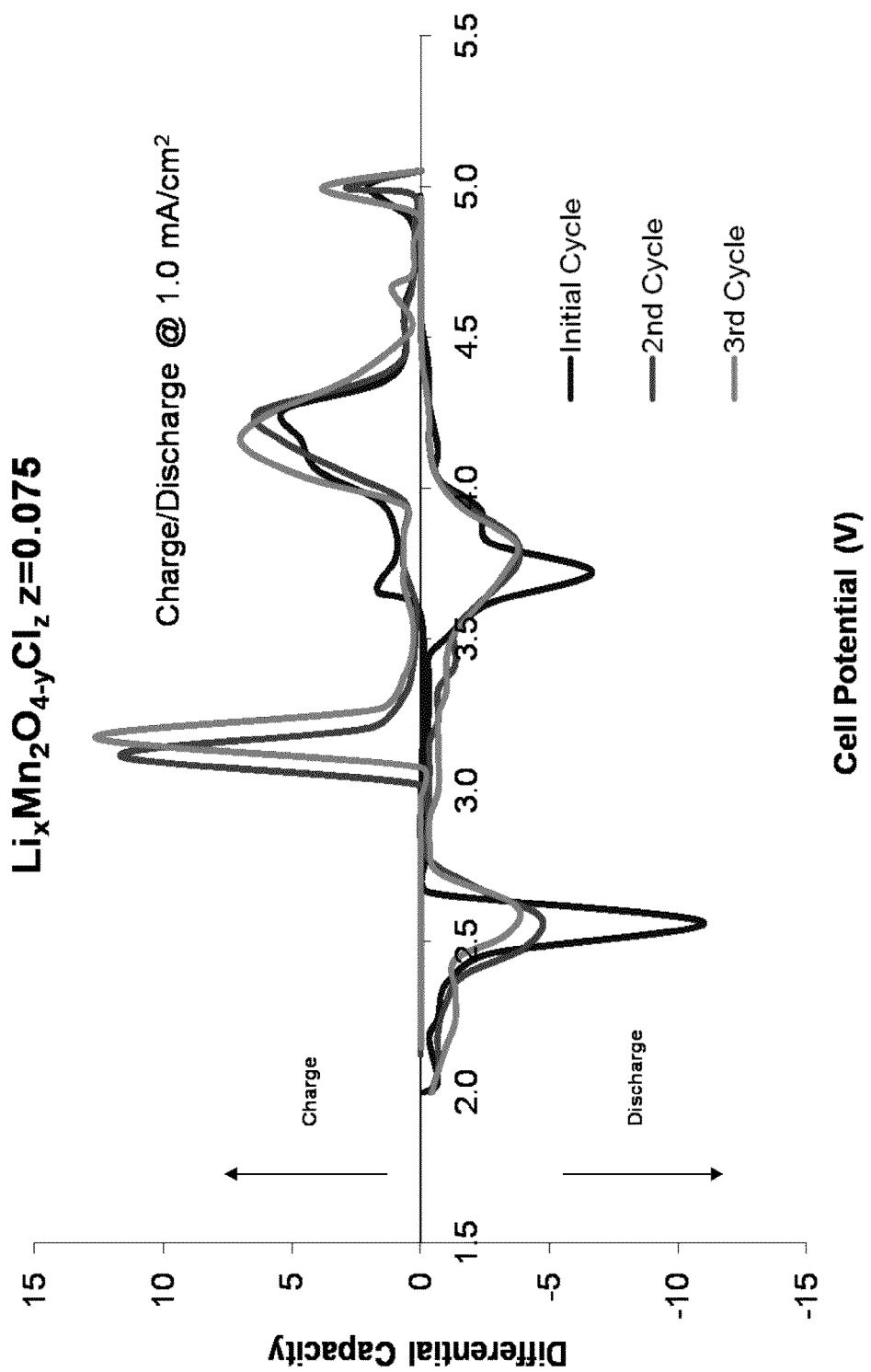
FIG. 13 is a graph illustrating representative cycling (charge/discharge) curves displayed as differential capacity for an exemplary $Li/Li_xMn_2O_{4-y}Cl_{0.075}$ cell (cycled between 5.2 and 2.0 volts at 2.0 mA).

As in FIGS. 6 and 7, the data in FIGS. 8 and 9 shows the high coulombic efficiency for exemplary $Li/Li_xMn_2O_{4-y}Cl_z$ cells according to the present disclosure. FIG. 10 also displays an exemplary $Li/Li_xMn_2O_{4-y}Cl_{0.025}$ cell according to the present disclosure, cycled between 3.0 and 5.2 volts. FIGS. 11 and 12 show charge and discharge curves for an exemplary $Li/Li_xMn_2O_{4-y}Cl_{0.025}$ cell according to the present disclosure, cycled between 5.0 and 2.0 volts at 0.5 mA and 0.25 mA. FIG. 13 shows charge and discharge curves for an exemplary $Li/Li_xMn_2O_{4-y}Cl_{0.075}$ cell according to the present disclosure, cycled between 5.2 and 2.0 volts at 1.0 mA. FIG. 11 shows the cell potential during charge and discharge cycles. FIGS. 12 and 13 illustrate cell potential displayed as differential capacity.

Based on the data in FIGS. 2 through 13, a stable chlorine-modified lithium manganese based $AB_2O_4$ spinel material was prepared, which may be used a positive electrode for lithium and lithium ion batteries. Furthermore, the data shows that the general formula for the chlorine-modified lithium manganese-based $AB_2O_4$ spinel cathode material according to the present disclosure is $Li_xMn_2O_{4-y}Cl_z$, where $x \approx 1$, $y \approx z$, and z ranges from 0.005 to 0.25; and the reversible region for x ranges from 0.05 to 1.9 in the lithium electrochemical cell. The initial specific capacity for this chlorine-modified lithium manganese-based $AB_2O_4$ spinel cathode material was 205 mAh/g when coupled with lithium and cycled between 2.0 and 4.25 volts. The coulombic efficiency of an exemplary $Li/Li_xMn_2O_{4-y}Cl_z$ electrochemical cell (where $x \approx 1$, $y \approx z$, and y and z range from 0.005 to 0.25) is at least 99 percent with a specific capacity of 130 mAh/g, when cycled between 4.25 volts and 3.0 volts. In contrast, conventional $Li/LiMn_2O_4$ electrochemical systems typically achieve 100 to 120 mAh/g. Furthermore, the discharge capacity of an exemplary $Li/Li_xMn_2O_{4-y}Cl_z$ electrochemical cell (where $x \approx 1$, $y \approx z$, and y and z range from 0.005 to 0.25) was maintained at greater than 80 percent the initial discharge for over 500 cycles when cycled between 5.0 and 3.0 volts and greater than 50 cycles when cycled between 5.0 and 2.0 volts. In addition, exemplary $Li/Li_xMn_2O_{4-y}Cl_z$ electrochemical cells (where $x \approx 1$, $y \approx z$, and y and z range from 0.005 to 0.25) maintained their recyclability after charge potentials greater than 5.0 volts and discharge potentials less than 2.0 volts were observed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method of preparing a chlorine-modified lithium manganese-based $AB_2O_4$ spinel cathode material via a solid state reaction, the method comprising:
   mixing a chlorinated lithium compound in a solid state, a manganese compound in a solid state, and a lithium compound in a solid state to produce a homogenous solid mixture; and
   calcining the homogenous solid mixture for a time period no greater than 4 hours at a temperature of at least 300° C.;
   wherein the lithium compound is a compound selected from a group consisting of $LiCO_3$, $LiOH$, $Li_2O_2$, and $Li_2O$.

2. The method according to claim 1, wherein the chlorinated lithium compound is a compound selected from a group consisting of $LiClO_4$ and $LiCl$.

3. The method according to claim 1, wherein the manganese compound is a compound selected from a group consisting of $MnO_2$, $Mn_2O_3$, $Mn_3O_4$, manganese nitrate, manganese hydroxide, and manganese acetate.

4. The method according to claim 1, wherein the mixing comprises grinding or milling the homogenous solid mixture.

5. The method according to claim 1, further comprising mixing the homogenous solid mixture with a conductive carbon and a binder.

6. The method according to claim 5, wherein the conductive carbon is selected from a group consisting of conductive carbon black, graphite, carbon nanofibers, and carbon nanoparticles.

7. The method according to claim 5, wherein the binder is selected from a group consisting of polytetrafluoroethylene, polyvinylidene fluoride, and latex.

* * * * *

UNITED STATES PATENT AND TRADEMARK OFFICE
CERTIFICATE OF CORRECTION

| | | |
|---|---|---|
| PATENT NO. | : 8,597,377 B1 | Page 1 of 1 |
| APPLICATION NO. | : 13/081774 | |
| DATED | : December 3, 2013 | |
| INVENTOR(S) | : Atwater et al. | |

It is certified that error appears in the above-identified patent and that said Letters Patent is hereby corrected as shown below:

In the Claims

Col. 9 lines 2-14 should read as follows:

"1. A method of preparing a chlorine-modified lithium manganese-based $AB_2O_4$ spinel cathode material via a solid state reaction, the method comprising:

mixing a chlorinated lithium compound in a solid state, a manganese compound in a solid state, and a lithium compound in a solid state to produce a homogenous solid mixture; and calcining the homogenous solid mixture for a time period no greater than 4 hours at a temperature of at least 300° C.;

wherein the lithium compound is a compound selected from a group consisting of $Li_2CO_3$, LiOH, $Li_2O_2$, and $Li_2O$."

Signed and Sealed this
Seventeenth Day of June, 2014

Michelle K. Lee
*Deputy Director of the United States Patent and Trademark Office*